US012478060B1

(12) United States Patent
Higdon et al.

(10) Patent No.: US 12,478,060 B1
(45) Date of Patent: Nov. 25, 2025

(54) DECOY STAKE SYSTEMS AND METHODS

(71) Applicant: Higdon Outdoors, LLC, Paducah, KY (US)

(72) Inventors: Benjamin R. Higdon, Paducah, KY (US); Zain Vanderboegh, Paducah, KY (US); Chelsea Trammell, Paducah, KY (US)

(73) Assignee: HIGDON OUTDOORS, LLC, Paducah, KY (US)

( * ) Notice: Subject to any disclaimer, the term of this patent is extended or adjusted under 35 U.S.C. 154(b) by 238 days.

(21) Appl. No.: 17/975,852

(22) Filed: Oct. 28, 2022

(51) Int. Cl.
*A01M 31/06* (2006.01)

(52) U.S. Cl.
CPC .................................. *A01M 31/06* (2013.01)

(58) Field of Classification Search
CPC ...................................................... A01M 31/06
See application file for complete search history.

(56) References Cited

U.S. PATENT DOCUMENTS

| 4,845,872 | A | 7/1989 | Anderson |
| 8,959,826 | B2 | 2/2015 | Dean et al. |
| 2001/0004812 | A1* | 6/2001 | Lindaman ............. A01M 31/06 248/156 |
| 2006/0053675 | A1 | 3/2006 | Lindaman |
| 2006/0143969 | A1 | 7/2006 | Lindaman |
| 2006/0143970 | A1 | 7/2006 | Lindaman |
| 2012/0324777 | A1* | 12/2012 | Smith ................... A01M 31/06 43/2 |
| 2013/0283664 | A1* | 10/2013 | Kelly ................... A01M 31/06 43/3 |
| 2016/0198701 | A1* | 7/2016 | Bartel ................... A01M 31/06 43/2 |
| 2022/0256836 | A1 | 8/2022 | Beal |

OTHER PUBLICATIONS

Cabela's, "RedHead Remote Strut Stake Gen-2" https://www.cabelas.com/shop/en/redhead-remote-strut-turkey-decoy-stake?ds_e=GOOGLE&ds_c=Cabelas%7CShopping%7CSmart%7CHunting%7CHunting%7CNAud%7CTopPerf%7CNMT&gclid=EAIaIQobChMIqsHigeDi-QIVIDizAB3Vhwl7EAQYCCABEgL-zfD_BwE&gclsrc=aw.ds. 2018.

* cited by examiner

*Primary Examiner* — Kimberly S Berona
*Assistant Examiner* — Steven J Shur
(74) *Attorney, Agent, or Firm* — C. Brandon Browning; Maynard Nexsen PC (57) ABSTRACT

A decoy system can include a rod defining an axis of rotation, a bracket coupled to a lower end of the rod, a pair of legs coupled to the bracket, and a decoy supported on the rod and configured to rotate about the axis. The bracket can include side panels defining opposing planes. The rod, decoy, and the pair of legs can be configured to extend within the opposing planes. The bracket can include a rotational stop configured to engage a first face and an opposing second face of the decoy for preventing more than 180 degree rotation of the decoy about the axis of rotation. A method of using the decoy can include providing the decoy, inserting the pair of legs into a surface, removing the pair of legs from the surface by pulling a handle of the rod away from the surface wherein the decoy remains intact.

20 Claims, 11 Drawing Sheets

Beginning
(On Rotation Stop 22)

FIG. 9B

Partial spin
(Not hitting Rotation Stop 22)

FIG. 9C

Full spin complete
(Hit Rotation Stop 22)

Beginning
(On Rotation Stop 22)
*FIG. 10A*

Partial spin
(Not hitting Rotation Stop 22)
*FIG. 10B*

Full spin complete
(Hit Rotation Stop 22)
*FIG. 10C*

FIG. 11

DECOY STAKE SYSTEMS AND METHODS

TECHNICAL FIELD

The present invention is directed to a decoy stake system for a substantially flat decoy stake that is configured to rotate in the wind when attached to a surface.

BACKGROUND

Decoys resembling animals are used to attract game or other desirable animals to locations near the decoys. For example, hunters utilize decoys to attract game to a particular location, while animal sighting enthusiasts use decoys to attract desirable animals for viewing and photographing within proximity of the decoy. The movement of animals to a location near the decoy allows hunters to draw the animals within range of a weapon and allows the viewing or photographing of animals within range of a camera or binoculars.

Decoys typically function by resembling an animal similar to one that is to be attracted and by mimicking the visual appearance of the animal. For example, a waterfowl decoy is designed to attract other waterfowl. However, stationary decoys may fail to be recognized by moving animals, such as flying waterfowl or other avian targets. Thus, decoys that can move to attract the attention of target animals are advantageous.

Current motion decoys can include at least one motor shaft that is attached to a moving component of the decoy. This configuration, while enabling motion of the decoy, limits the use of the decoy to a particular are over a period of time, as relocation of the decoy involves time consuming steps of disassembly and reassembly at a new location. Additionally, motorized motion decoys require a power source, which needs to be recharged frequently, hampering continuous use. Finally, existing motion decoys are difficult to store in a disassembled state as they are not capable of being stored in a substantially flat configuration. Other current motion decoys lack a motor shaft, and rely on the environment (e.g., wind) to provide a motion element. However, these decoys can spin uncontrollably in the wind, thereby preventing the decoy from attracting the target animal. In addition, current wind motion decoys are not capable of being quickly relocated without time consuming disassembly and are difficult to store.

The present invention is directed to these and other considerations. For example, the present invention is directed to a substantially flat decoy stake that is capable of moving in the presence of wind when attached to a surface, such as the ground of the environment. Additionally, a motion stop prevents the substantially flat decoy from rotating uncontrollably in the presence of a strong wind. The present invention also enables the substantially flat decoy stake to be removed from a location without disassembly and enables convenient storage due to the substantially flat form factor.

SUMMARY OF THE INVENTION

In one aspect, a decoy system is disclosed. The decoy system can include a decoy stake. The decoy stake can include a rod that defines an axis of rotation. The decoy stake can include a bracket coupled to a lower end of the rod. The bracket can include opposing side panels which define opposing planes. The decoy stake can include at least one leg that has an upper end that is coupled to the bracket, the at least one leg being configured to remain stationary and not rotate when inserted into the ground. The decoy stake can additionally include a substantially flat decoy that is supported on the rod. The substantially flat decoy can be configured to rotate about the axis of rotation. The rod, the decoy, and the pair of legs can be selectively configurable to simultaneously extend within and not outside the opposing planes.

In some embodiments, the substantially flat decoy can be constructed out of a corrugated material, such as cardboard. In some embodiments, the rod can be configured to be removably inserted completely through the corrugated material of the substantially flat decoy.

In some embodiments, the rod can include an upper end that forms a handle.

In some embodiments, the bracket can include a rotational stop configured to engage a first face and an opposing second face of the substantially flat decoy. The rotational stop can prevent more than 180 degree rotation of the substantially flat decoy about the axis of rotation.

In some embodiments, the substantially flat decoy can include a lower edge that is directly rotatably supported on a top surface of the bracket.

In some embodiments, the rod is spaced from the pair of legs by the bracket.

In some embodiments, the at least one leg is a pair of legs that are detachably coupled to the bracket.

In another aspect, a decoy system is disclosed. The decoy system can include a decoy stake. The decoy stake can include a rod defining an axis of rotation. The decoy stake can include a bracket coupled to a lower end of the rod. The bracket can include opposing side panels defining opposing planes. The decoy stake can include a pair of legs having an upper end coupled to the bracket. The decoy system can include a substantially flat decoy supported on the rod and configured to rotate about the axis of rotation. The bracket can include a rotational stop configured to engage a first face and an opposing second face of the substantially flat decoy for preventing more than 180 degree rotation of the substantially flat decoy about the axis of rotation.

In some embodiments, the rod, the decoy, and the pair of legs are selectively configured to simultaneously extend within and not outside the opposing planes.

In some embodiments, the substantially flat decoy can include a corrugated material and the rod is configured to be removably inserted completely through the corrugated material.

In some embodiments, the rod can include an upper end forming a handle.

In some embodiments, the substantially flat decoy can include a lower edge that is directly rotatably supported on a top surface of the bracket.

In some embodiments, the rod is spaced from the pair of legs by the bracket.

In some embodiments, the pair of legs are detachably coupled to the bracket.

In another aspect, a method of using a decoy is disclosed. The method can include providing a decoy stake. The decoy stake can include a rod defining an axis of rotation, an upper end forming a handle, a bracket coupled to the lower end of the rod, a substantially flat decoy supported on the rod between the handle and the bracket and configured to rotate about the axis of rotation, and a pair of legs having an upper end coupled to the bracket. The method can include inserting the pair of legs into a surface. The method can include removing the pair of legs from the surface by pulling the handle away from the surface. The decoy stake can remain intact when pulling the handle away from the surface.

In some embodiments, the bracket can include a rotational stop configured to engage a first face and an opposing second face of the substantially flat decoy. The method can further include preventing more than 180 degree rotation of the substantially flat decoy about the axis of rotation.

In some embodiments, the bracket can include opposing side panels defining opposing planes. The method can further include causing a rod, the substantially flat decoy, and the pair of legs to simultaneously extend within and not outside of the opposing planes.

In some embodiments, the method can include storing the decoy stake by stacking a plurality of decoy stakes together in a substantially flat configuration.

In some embodiments, the method can include causing the substantially flat decoy to rotate about the axis of rotation while the rod remains stationary.

BRIEF DESCRIPTION OF THE DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is directed to a decoy system including a substantially flat decoy mounted on a rod, the rod coupled to a bracket coupled to a lower end of the rod, and a pair of legs having an upper end coupled to the bracket. The decoy can be configured to rotate about an axis of rotation defined by the rod. The bracket can include opposing side panels that define opposing planes, and the substantially flat decoy can be configured to extend within and not outside the opposing planes.

As used herein, "game" refers to any animal desired to be lured by or attracted to the decoy. Game may include animals targeted in hunting, though other activities are contemplated by the present disclosure. For example, game includes animals targeted by outdoor enthusiasts for viewing or photographing. Game includes owl, such as waterfowl.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an", and "the" are intended to include the plural forms as well (i.e., "at least one" of what is described), unless the context clearly indicates otherwise. In every case, use of singular articles and pronouns should be interpreted to support claims to at least one of what is described, and to support claims to exactly one of what is described.

Terms such as "at least one of A and B" should be understood to mean "only A, only B, or both A and B." The same construction should be applied to longer lists (e.g., "at least one of A, B, and C").

Figure 1:
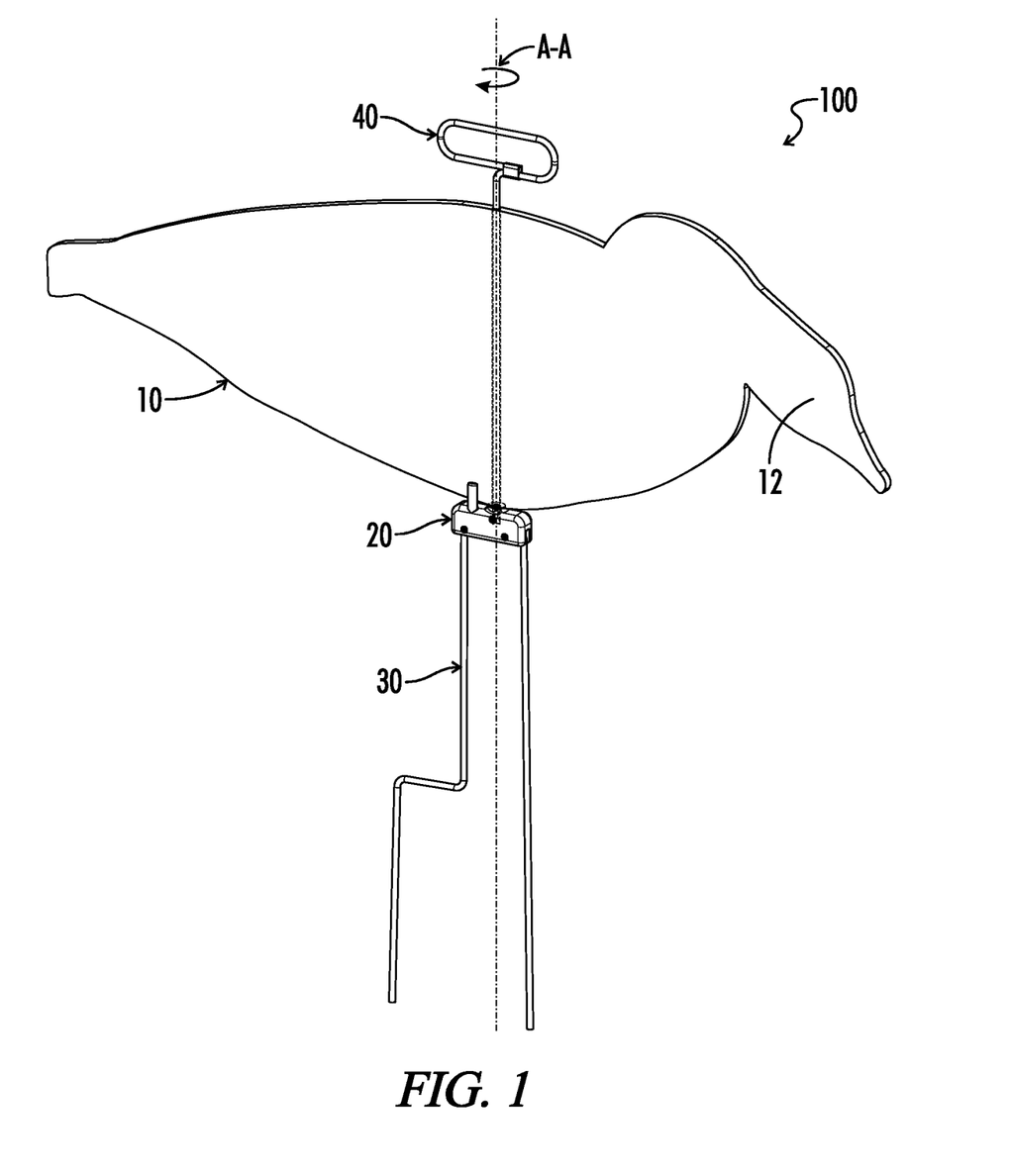
FIG. 1 depicts a decoy system in an assembled configuration in a first orientation, according to aspects of the present disclosure.
Figure 2:
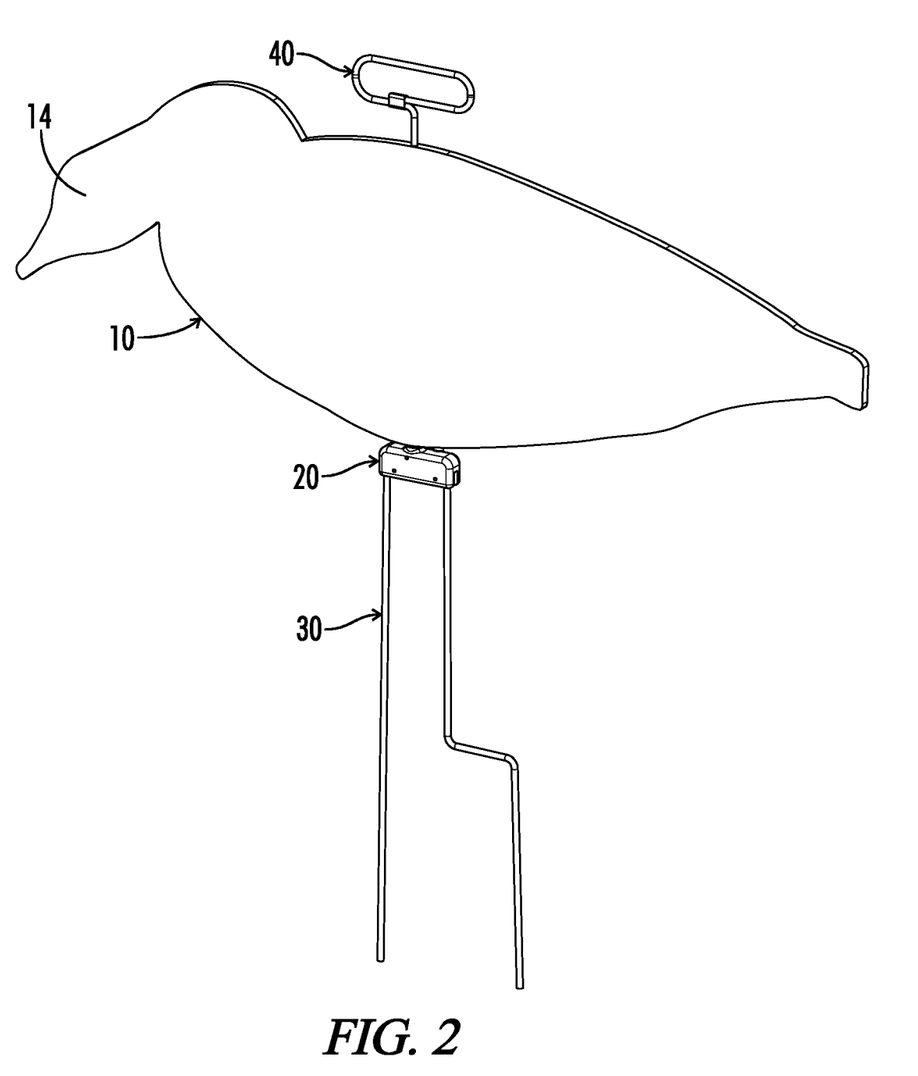
FIG. 2 depicts the decoy system in an assembled configuration in a second orientation, according to aspects of the present disclosure.

FIGS. 1 and 2 depict a decoy system 100 in an assembled configuration. FIG. 1 shows the decoy system 100 in a first orientation (e.g., rotated in a first orientation) and FIG. 2 shows the decoy system 100 in a second orientation (e.g., rotated in a second orientation). As shown in FIGS. 1 and 2, the decoy system 100 can include a rod 40 that defines an axis of rotation A-A. The rod 40 can be coupled to a substantially flat decoy body 10 and a decoy bracket 20. The decoy bracket 20 can be coupled to decoy legs 30 at an upper end of the decoy legs 30. In some embodiments, the decoy legs 30 can include a pair of legs that are configured for being placed into a surface, such as the ground to support the decoy system 100. In other embodiments, the system may include a single leg that is arranged to prevent rotation of the leg when inserted into the ground including, for example, a ground stake having shaft with an x-shaped cross-section. As shown in FIG. 1, the substantially flat decoy body 10 can have a first face 12 that is visible when the decoy system 100 is in the first orientation, and as shown in FIG. 2, the substantially flat decoy body 10 can have a second face 14 that is visible when the decoy system 100 is in the second orientation. As will be described in further detail below, the decoy legs 30 include an upper end that is configured to be detachably attached to the decoy bracket 20. The decoy bracket 20 is also configured to attach to a lower end of the rod 40, and the rod 40 is configured to rotatably couple to the substantially flat decoy body 10. The substantially flat decoy body 10 can be constructed of a corrugated material, for example, but not limited to cardboard. In some embodiments, the lower end of rod 40 can be configured for being placed through the corrugated material of the substantially flat decoy body 10 before being attached to a top face of the decoy bracket 20, thereby rotatably coupling the rod 40 to the substantially flat decoy body 10. As used herein with respect to the substantially flat decoy body 10, substantially flat means that a plurality of substantially flat decoy bodies 10 can be efficiently stacked on top of another in the assembled state with little to no gaps between each respective decoy system 100, providing for a convenient means of storing a plurality of decoy systems 100 as described herein.

Figure 3:
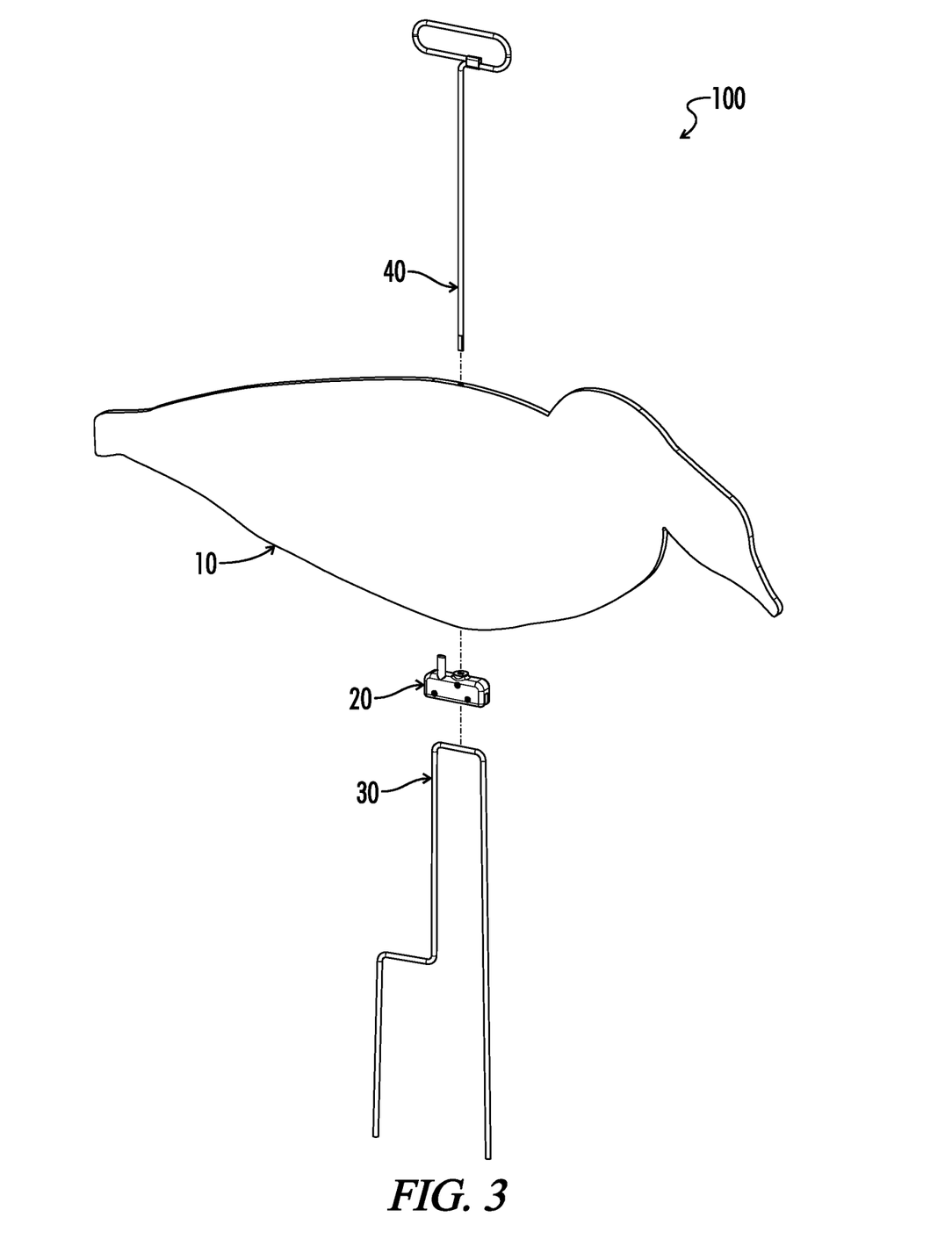
FIG. 3 depicts an exploded view of the decoy system, according to aspects of the present disclosure.

FIG. 3 depicts an exploded view of the decoy system 100. Decoy system 100 can be quickly and easily disassembled into the constituent components of substantially flat decoy body 10, decoy bracket 20, decoy legs 30, and rod 40 if desired. However, in some embodiments, the decoy system 100 is configured to be stored in an assembled configuration for convenience.

Figure 4A:
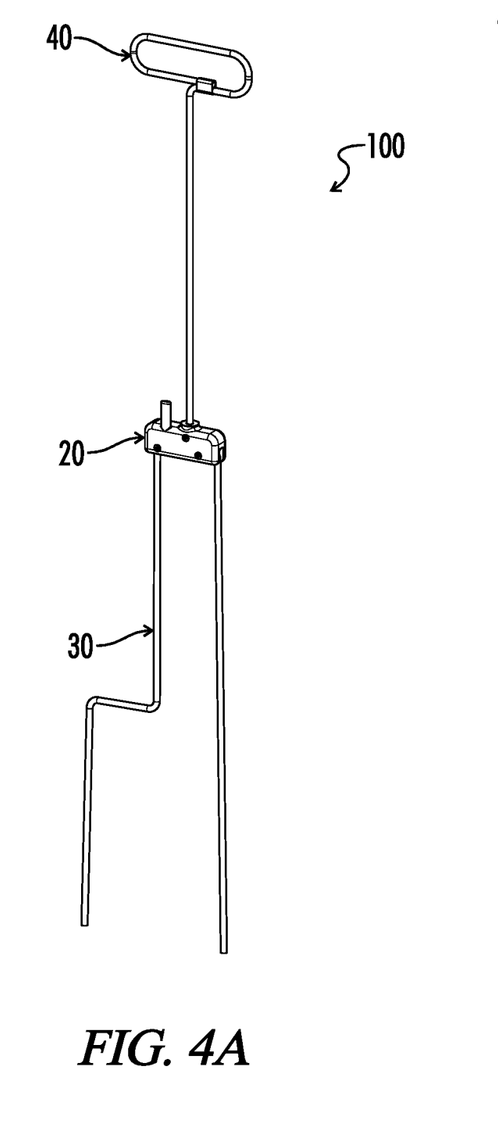
FIG. 4A depicts the decoy system in an assembled configuration in a first orientation without the presence of a substantially flat decoy, according to aspects of the present disclosure.
Figure 4B:
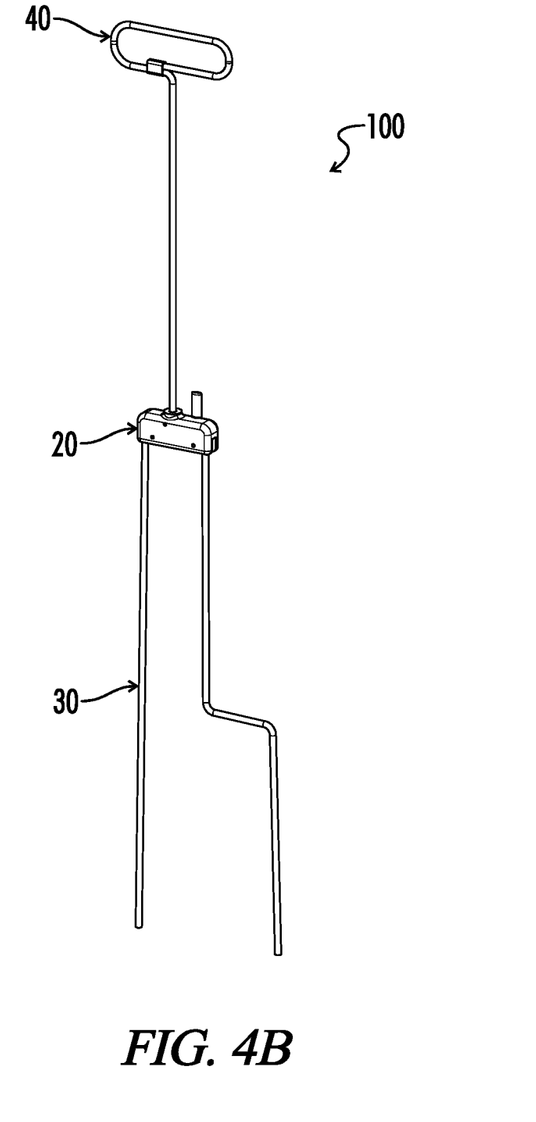
FIG. 4B depicts the decoy system in an assembled in a second orientation without the presence of the substantially flat decoy, according to aspects of the present disclosure.

FIGS. 4A and 4B show the decoy system 100 in an assembled configuration but without the substantially flat decoy body 10. As shown and previously described with respect to FIGS. 1 and 2, a lower end of rod 40 can attach to the top face of decoy bracket 20, and an upper end of decoy legs 30 can attach to the lower face of decoy bracket 20. Although rod 40 is shown as being a single rod, multiple rods can be implemented in some embodiments. Similarly, although decoy legs 30 are shown as having a pair of legs configured to attach the decoy system 100 to a surface, more or less than a pair of legs (e.g., a single leg, three legs, or more than three legs) can also be used to attach the decoy system 100 to a surface.

Figure 5A:
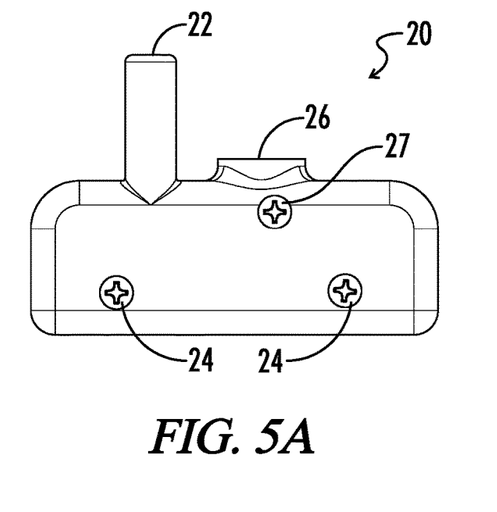
FIG. 5A depicts a front face of the decoy system bracket, according to aspects of the present disclosure.
Figure 5B:
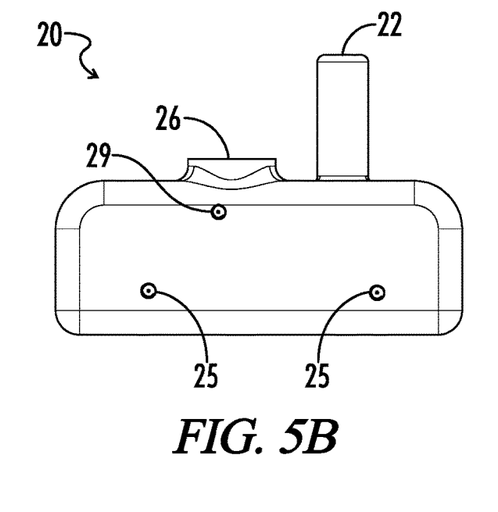
FIG. 5B depicts a rear face of the decoy system bracket, according to aspects of the present disclosure.
Figure 5C:
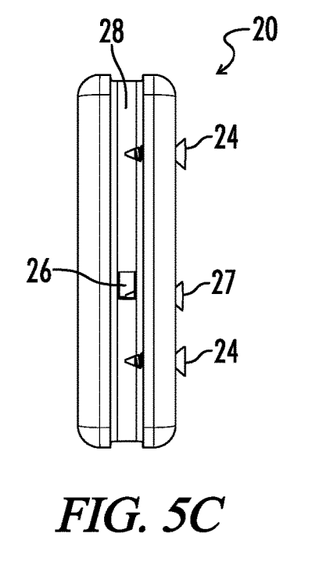
FIG. 5C depicts a bottom face of the decoy system bracket, according to aspects of the present disclosure.
Figures 5D, 5E:
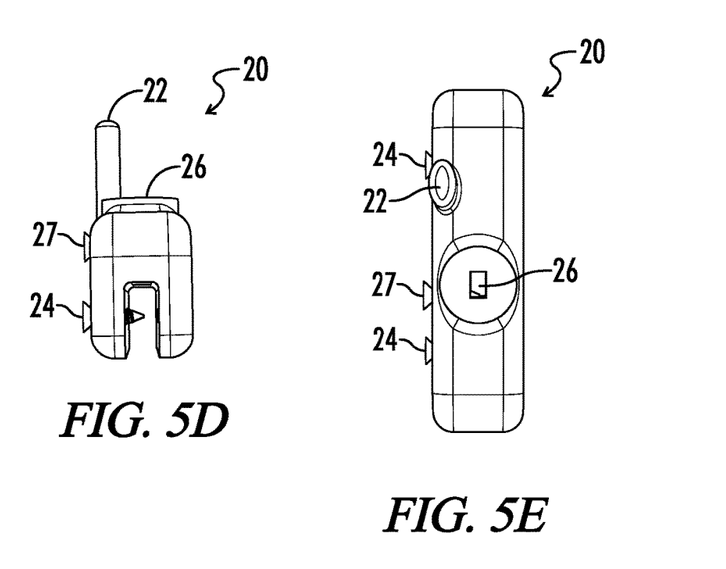
FIG. 5D depicts a front profile view of the decoy system bracket, according to aspects of the present disclosure.
FIG. 5E depicts a top face of the decoy system bracket, according to aspects of the present disclosure.

FIGS. 5A through 5E show various views of decoy bracket 20, according to aspects of present disclosure. More specifically, FIG. 5A depicts a front face of the decoy system bracket 20, FIG. 5B depicts a rear face of the decoy system bracket 20, FIG. 5C depicts a bottom face of the decoy system bracket 20, FIG. 5D depicts a front profile view of the decoy system bracket 20, and FIG. 5E depicts a top face of the decoy system bracket 20.

As shown in FIGS. 5A, the decoy system bracket 20 can include one or more leg attachment screws 24, a rod attachment screw 27, and a rod aperture 26. Although there are shown two leg attachment screws 24 in FIG. 5A, any number of leg attachment screws 24 can be used in lieu of two leg attachment screws 24. Additionally, although this disclosure refers to leg attachment screws, a person having pertinent skill in the relevant art would understand that any suitable fastener may be used in lieu of a leg attachment screw 24. For example, in place of screws, nuts and bolts can be used, but other attachment means are also contemplated. Similarly, with respect to rod attachment screw 27, in some embodiments more than one rod attachment screw 27 may be employed in lieu of a single rod attachment screw. As would be understood by a person having pertinent skill in the relevant art, another fastener type can be employed in lieu of a screw for rod attachment screw 27, for example but not limited to a nut and bolt. Each leg attachment screw 24 can be placed within a respective leg attachment screw aperture 25, as best seen in FIG. 5B. Similarly, rod attachment screw can be placed within a rod attachment screw aperture 29. Leg attachment screw apertures 25 and rod attachment screw apertures 29 may be apertures passing completely through the front face and the back face of decoy bracket 20, although in some embodiments, the apertures 25, 29 may not pass all the way through the front and rear face. For example, the apertures 25, 29 may pass through only front face or only rear face and end within the body of decoy bracket 20. Aperture 25, 29 may be threaded in order to provide a means for conveniently attaching screws 24, 27 to the decoy bracket 20. Rotation stop 22 is configured to prevent the rotation of substantially flat decoy body 10 from rotating more than 180 degrees. Rotation stop 22 provides the benefit of insuring that the substantially flat decoy body does not uncontrollably spill in strong gusts of wind.

As best seen in FIGS. 5C-5D, the decoy bracket 20 can include a recess 28. Recess 28 can be configured to receive a bracket attachment section 31 (described infra with respect to FIGS. 8A-8B) within recess 28 to thereby couple or fasten decoy leg 30 to decoy bracket 20. Once bracket attachment section 31 is placed within recess 28, leg attachment screws 24 (or other suitable fasteners) can be tightened to secure decoy legs 30 to the decoy bracket 20. Similarly, decoy legs 30 can be decoupled from decoy bracket 20 by loosening leg attachment screws 24 and removing the bracket attachment section 31 from recess 28. As best seen in FIG. 5E, rod 40 can be configured to couple to the decoy bracket 20 by placing rod attachment end 46 (described infra with respect to FIG. 7) through rod aperture 26 of decoy bracket 20. After rod attachment 46 is placed through rod aperture 26 of decoy bracket, rod attachment screw 27 (or another suitable fastener) can be tightened to thereby secure rod 40 to the decoy bracket 20. Similarly, rod 40 can be decoupled from the decoy bracket 20 by loosening rod attachment screw 27 and removing the rod attachment end 46 from the decoy bracket 20.

Figure 6A:
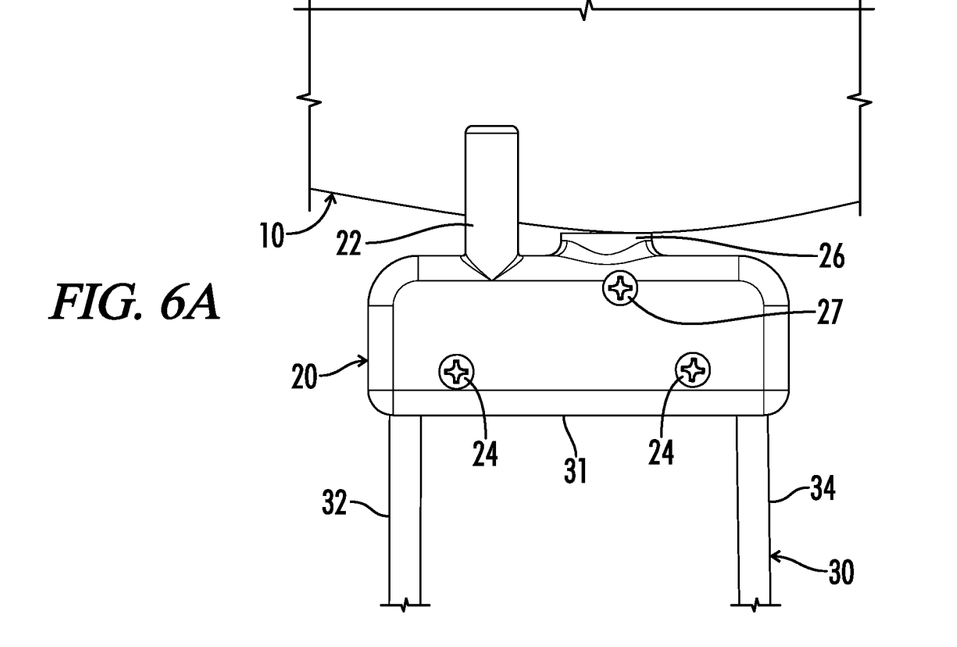
FIG. 6A depicts the decoy system bracket attached to the substantially flat decoy and decoy legs in a first orientation, according to aspects of the present disclosure.
Figure 6B:
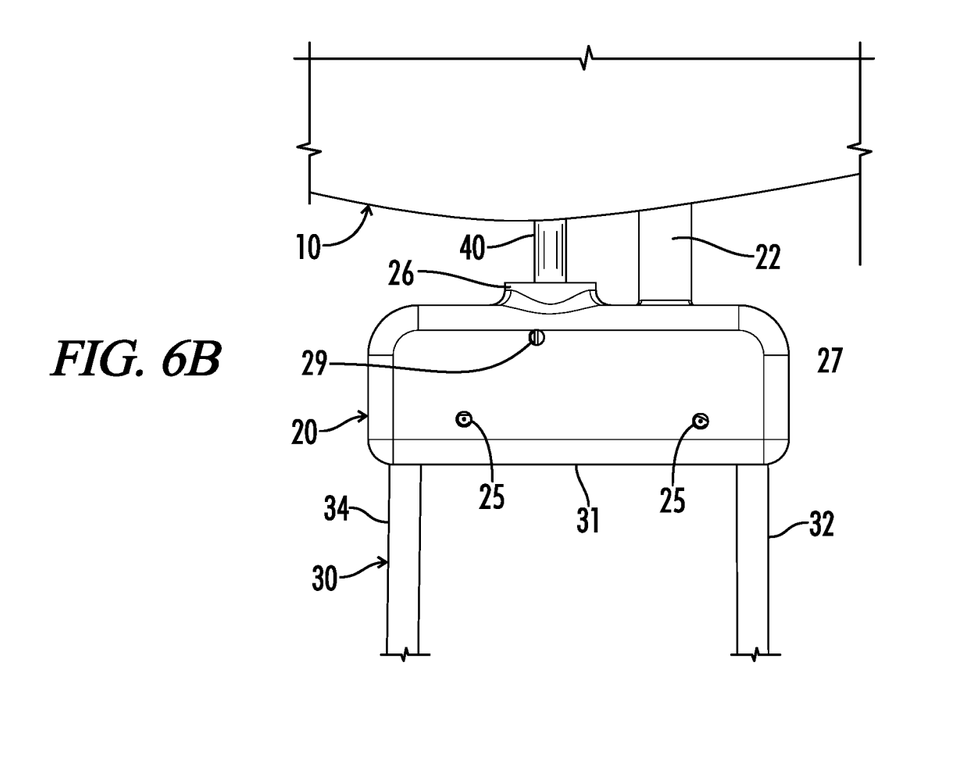
FIG. 6B depicts the decoy system bracket attached to the substantially flat decoy and the decoy legs in a second orientation, according to aspects of the present disclosure.

FIGS. 6A and 6B show the decoy legs 30 coupled to the decoy bracket 20. Decoy legs 30 can include a first leg 32 and a second leg 34 defining a pair of legs. On a top end of decoy legs 30, the decoy legs 30 can include a bracket attachment section 31. Bracket attachment section 31 can be approximately perpendicular to the pair of legs 32, 34 of decoy legs 30. As described above, bracket attachment section 31 can be configured to couple to decoy bracket 20 by fitting into recess 28 of decoy bracket 20 and be further fastened thereto by tightened leg attachment screws 24. Rod 40 can be seen extending from rod aperture 26 and through the substantially flat decoy body 10. Substantially flat decoy body 10 can be configured to rotate about axis of rotation A-A (not shown) defined by rod 40. Stop 22 can be configured to prevent the rotation of substantially flat body more than 180 degrees by interfering with substantially flat decoy body 10 as shown in FIGS. 6A and 6B. In some embodiments, a front face and a rear face of decoy bracket 20 can define opposing planes, and the substantially flat decoy body 10 can be configured to extend within and not outside the opposing planes. In other words, stop 22 can prevent substantially flat decoy body 10 from extending outside the opposing planes defined by the front face and rear face of decoy bracket 20.

Figure 7:
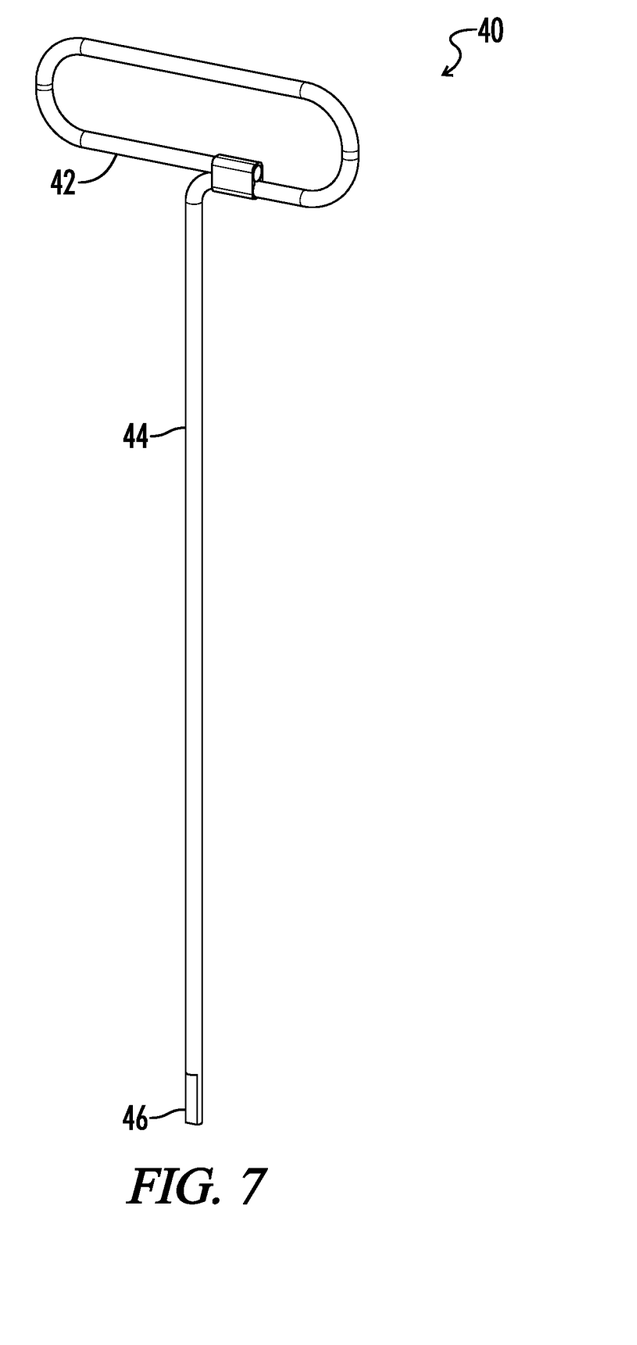
FIG. 7 depicts a rod, according to aspects of the present disclosure.

FIG. 7 depicts rod 40. As shown, rod 40 includes a handle 42, rod body 44, and rod attachment end 46. When rod 40, decoy body 10, and decoy legs 30 are all coupled to the decoy bracket 20 (e.g., when decoy system 100 is in an assembled state), handle 42 can be used to withdraw decoy system 100 from a surface with the decoy system 100 remaining in the assembled state. Rod body 44 can be configured to be inserted through the substantially flat decoy body 10 and then the rod attachment end 46 can be inserted into the rod aperture 26 to thereby couple the rod 40 to the decoy bracket 20 and the substantially flat decoy body 10 to the rod 40 and the decoy bracket 20. Rod 40 can be constructed of any suitable material. For example, rod 40 can be constructed of a metal such as aluminum although other suitable materials are envisioned.

Figure 8A:
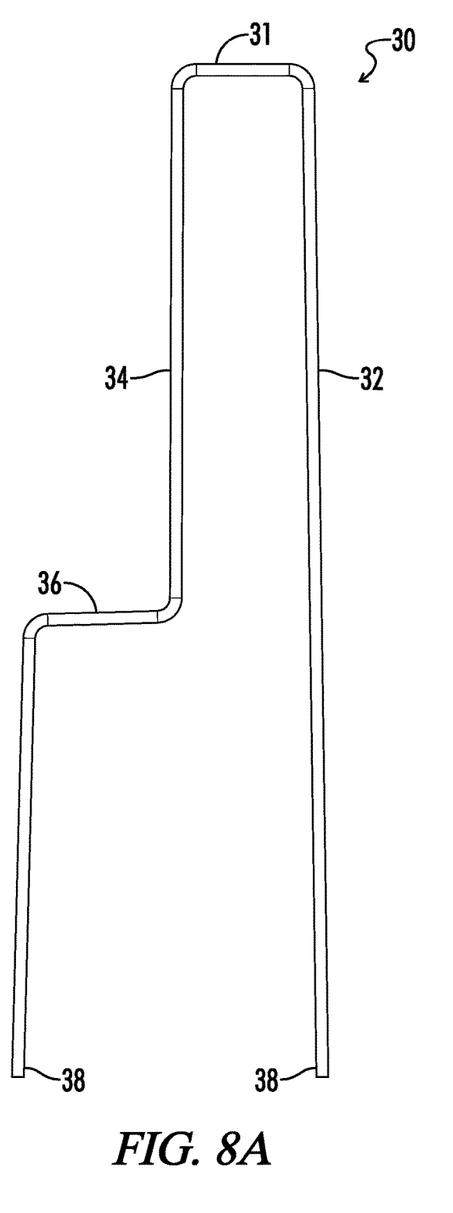
FIG. 8A depicts the decoy legs in a first orientation, according to aspects of the present disclosure.
Figure 8B:
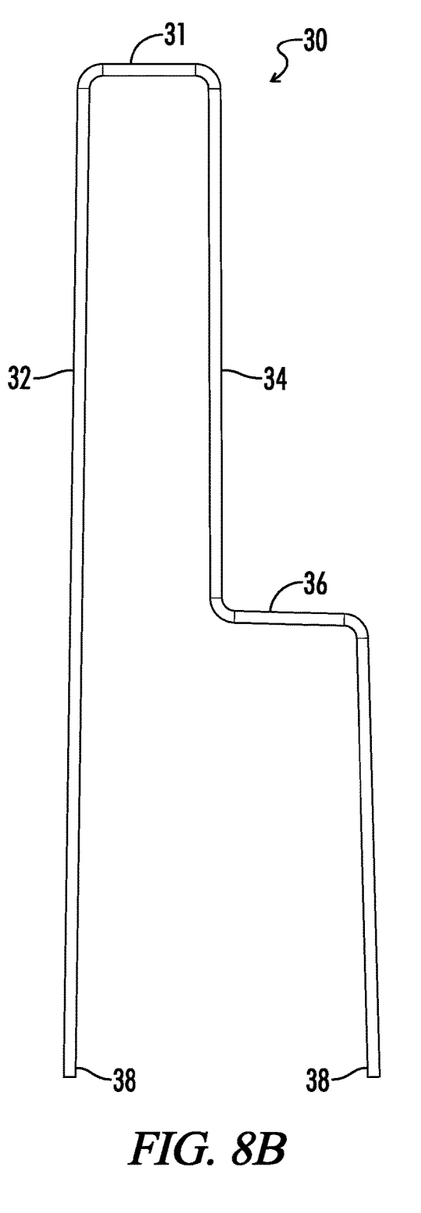
FIG. 8B depicts the decoy legs in a second orientation, according to aspects of the present disclosure.

FIGS. 8A and 8B depict the decoy legs 30 in a first orientation and a second orientation, respectively. As shown decoy legs 30 can include a bracket attachment section 31 that is approximately perpendicular to the decoy legs 31, 32. First decoy leg 32 can be approximately linear, and second leg 34 can have an approximately linear section and a second leg bend 36 that is approximately perpendicular to the first decoy leg 32. The decoy legs 32, 34 can end in leg ends 38 that are configured to be placed into a surface to hold decoy system 100 upright. For example, leg ends 38 can be configured to be placed through the surface of the ground in order to hold decoy system 100 upright.

Figure 9A:
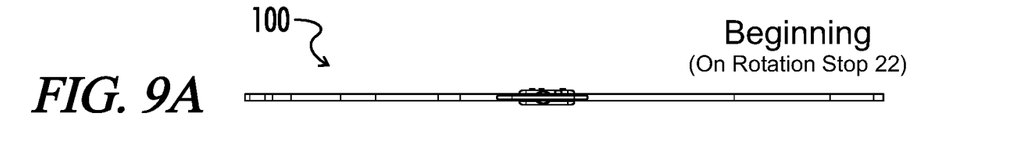
FIG. 9A depicts a top-down view of the decoy system in a starting orientation, according to aspects of the present disclosure.
Figure 9B:
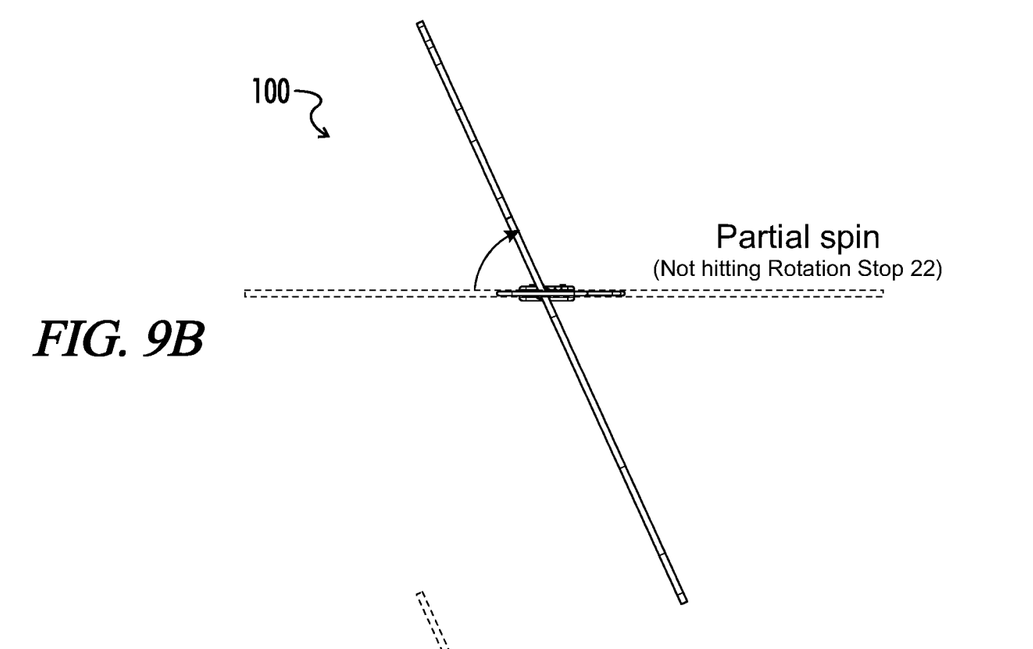
FIG. 9B depicts a top-down view of the decoy system after a partial rotation, according to aspects of the present disclosure.
Figure 9C:
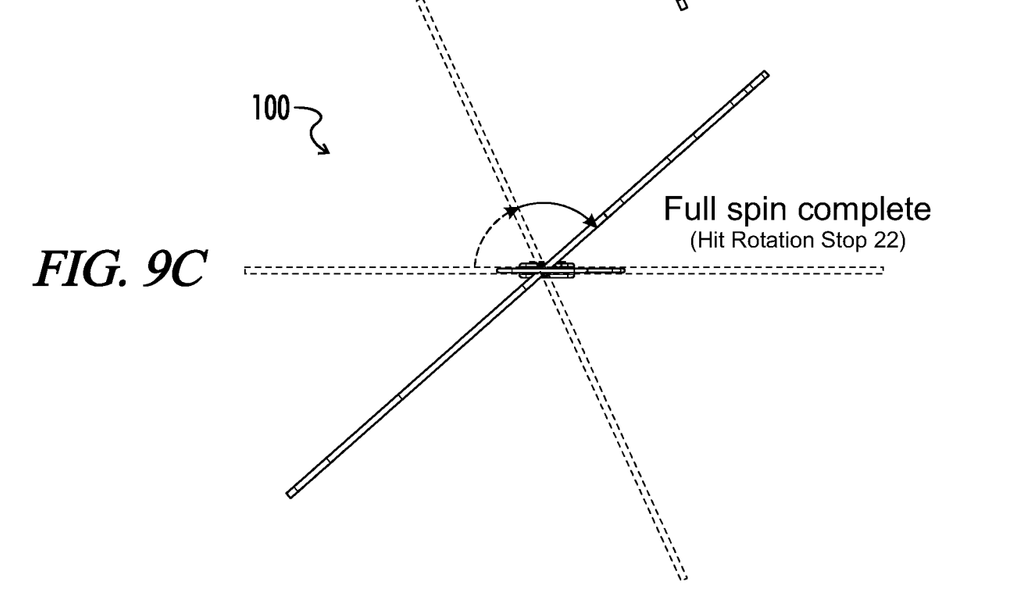
FIG. 9C depicts a top-down view of the decoy system after a complete rotation, according to aspects of the present disclosure.
Figure 10A:
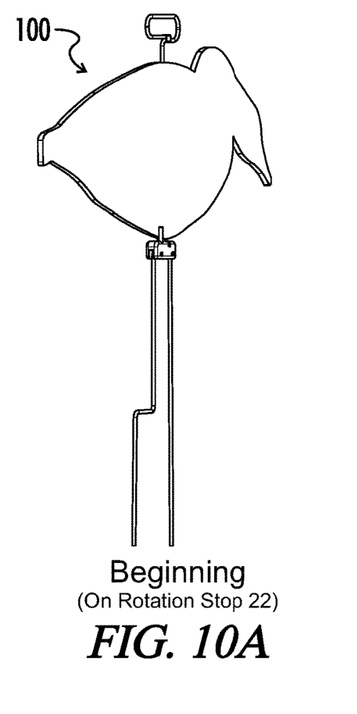
FIG. 10A depicts a profile view of the decoy system in a starting orientation, according to aspects of the present disclosure.
Figure 10B:
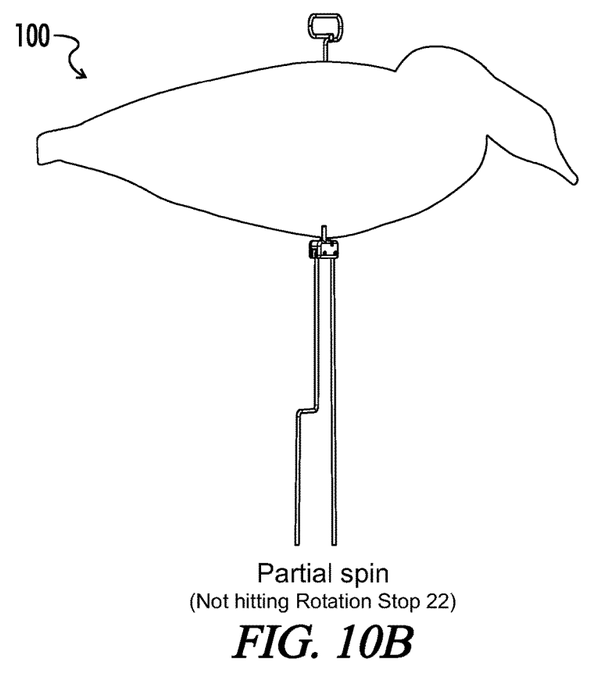
FIG. 10B depicts a profile view of the decoy system after a partial rotation, according to aspects of the present disclosure.
Figure 10C:
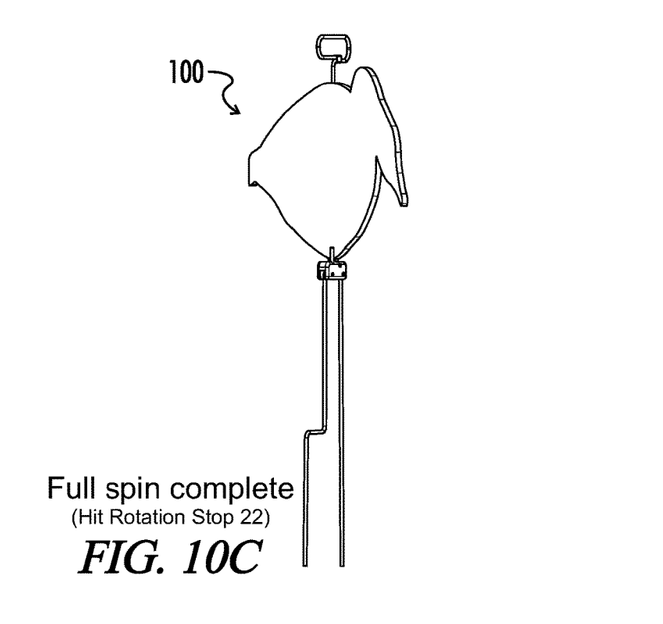
FIG. 10C depicts a profile view of the decoy system after a complete rotation, according to aspects of the present disclosure.

FIGS. 9A-9C depict top-down views of decoy system 100 at various orientations. In FIG. 9A, the decoy system 100 is oriented such that decoy body 10 is flat against rotation stop 22. FIG. 9B depicts decoy system 100 with decoy body 10 oriented at an angle (e.g., rotated in a clockwise direction) with respect to the starting position of decoy body 10 in FIG. 9A. As shown in FIG. 9B, decoy body 10 has completed a partial rotation and has not come into contact with rotation stop 22, and is free to continue rotation in the clockwise direction. In FIG. 9C, the decoy body 10 is shown continuing a clockwise rotation until it comes into contact with rotation stop 22. At this point, rotation stop 22 blocks further clockwise rotation of decoy body 10. Although the angle of rotation shown in FIG. 9C is less than 180 degrees, in some embodiments, the rotation stop 22 can allow decoy body 10 of decoy system 100 to rotate approximately 180 degrees. In some embodiments, rotation stop 22 can be configured to allow decoy body 10 to rotate no more than approximately 180 degrees. It should be noted that although decoy system 100 is shown rotating in a clockwise orientation in FIGS. 9A-9C, decoy system 100 can similarly rotate in a counterclockwise direction (e.g., from a position as shown in FIG. 9C to the position shown in FIG. 9A). FIGS. 10A-10C depict profile views of decoy system 100 at various orientations. The position of decoy system 100 in FIG. 10A corresponds to the position of decoy system 100 in FIG. 9A, the position of decoy system 100 in FIG. 10B corresponds to the position of decoy system 100 in FIG. 9B, and the position of decoy system 100 in FIG. 10C corresponds to the position of decoy system 100 in FIG. 9C. As described above with respect to FIGS. 9A-9C, decoy system 100 can rotate in a counterclockwise or a clockwise direction.

Figure 11:
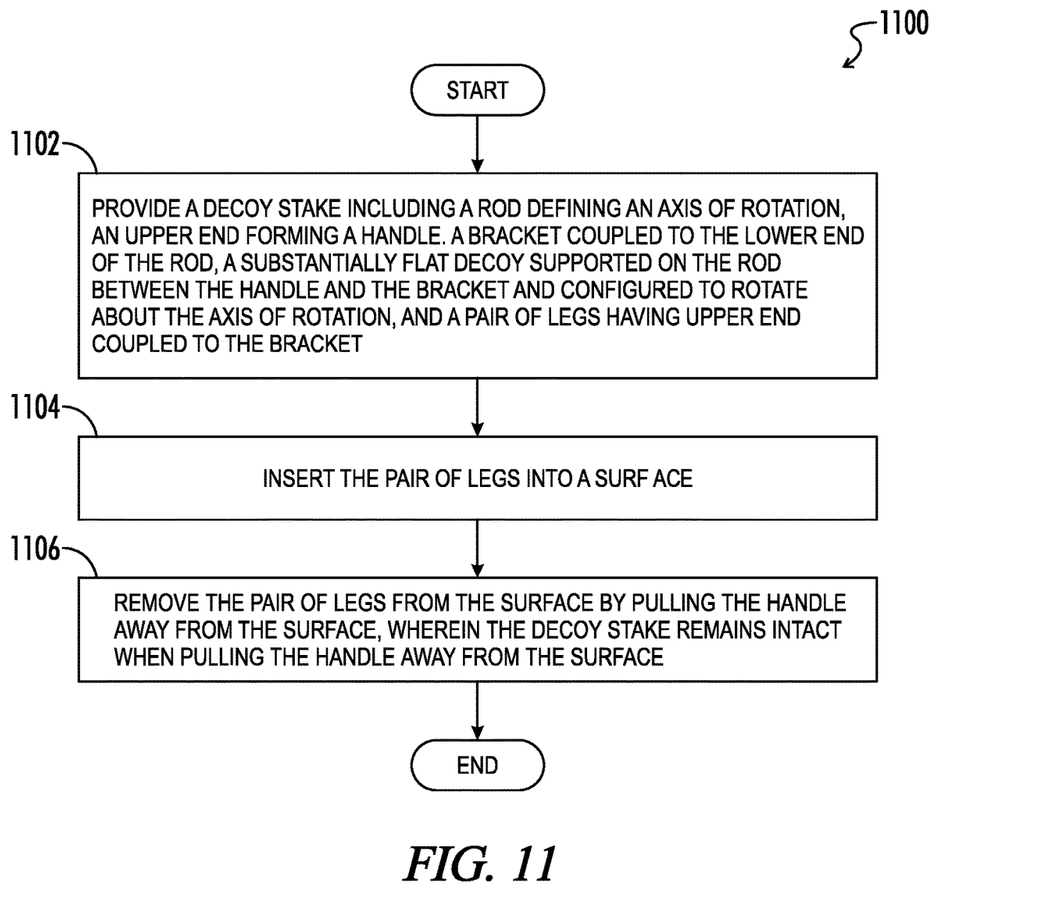
FIG. 11 is a flowchart demonstrating an exemplary method of using a decoy, according to aspects of the present disclosure.

FIG. 11 is a flowchart demonstrating an exemplary method of using a decoy. The method of FIG. 11 can be implemented using elements of decoy system 100 as previously described with respect to FIGS. 1-10C. In block 1102, the method can include providing a decoy stake. Decoy stake can include a rod 40 defining an axis of rotation A-A. The rod can include an upper end forming a rod handle 42. The decoy stake can include a decoy bracket 20 that is coupled to the lower end of the rod (e.g., by attaching rod attachment end 46 to rod aperture 26 of decoy bracket 20). The decoy stake can include a substantially flat decoy 10 that is supported on the rod 40 between the handle 42 and the decoy bracket 20. The substantially flat decoy 10 can be configured to rotate about the axis of rotation A-A. The decoy stake can additionally include a pair of legs 32, 34 (e.g., first leg 32 and second leg 34 of decoy legs 30). The decoy legs 30 can have an upper end coupled to the decoy bracket 20 (e.g., the bracket attachment section 31 can be configured to fit into the bracket recess 28 to attach decoy legs 30 to the decoy bracket 20).

In block 1104, the method can include inserting the pair of legs 32, 34, into a surface. For example, the pair of legs 32, 34 can be placed into the ground outdoors in order to situate decoy system 100 in an upright position.

In block 1106, the method can include removing the pair of legs 32, 34 from the surface by pulling the handle 42 away from the surface. When the pair of legs 32, 34 are removed from the surface by pulling the handle 42, decoy stake 100 (e.g., substantially flat decoy body 10, decoy bracket 20, decoy legs 30, and rod 40) can remain intact (e.g., in an assembled configuration).

According to some embodiments, the method can include preventing more than 180 degree rotation of the substantially flat decoy body 10 about the axis of rotation A-A while the decoy legs 30 are placed into a surface and the decoy system 100 is in an upright position.

According to some embodiments, the decoy bracket 20 can include opposing side panels (e.g., a front/first face and a rear/second face) that define opposing planes and the method can include causing the rod 40, the substantially flat decoy 10, and the pair of legs 32, 34 to simultaneously extend within and not outside of the opposing planes. For example, the rotation stop 22 of the decoy bracket can prevent the substantially flat decoy body from extending outside of the opposing planes.

According to some embodiments, the method can include storing the decoy stake by stacking a plurality of decoy stakes (e.g. decoy systems 100) together in a substantially flat configuration.

According to some embodiments, the method can include causing the substantially flat decoy body 10 to rotate about the axis of rotation A-A while the rod 40 remains stationary.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices, and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A decoy system comprising:
   a decoy stake including:
      a rod;
      a bracket coupled to a lower end of the rod, the bracket including opposing side panels defining opposing planes; and
      at least one leg having an upper end coupled to the bracket; and
   a substantially flat decoy supported on the rod and configured to rotate about the rod;
   wherein the rod and the at least one leg are selectively configurable to simultaneously extend within and not outside the opposing planes and the bracket is configured for preventing rotation of the rod and the at least one leg relative thereto; and
   the bracket including a rotational stop configured to directly contact a first face of the substantially flat decoy for preventing more than 180 degree rotation of the substantially flat decoy about the rod.

2. The decoy system of claim 1, wherein the substantially flat decoy includes a corrugated material.

3. The decoy system of claim 2, wherein the rod is configured to be removably inserted completely through the corrugated material of the substantially flat decoy.

4. The decoy system of claim 1, the rod including an upper end forming a handle.

5. The decoy system of claim 1, the substantially flat decoy including a lower edge that is directly rotatably supported on a top surface of the bracket.

6. The decoy system of claim 1, wherein the rod is spaced from the at least one leg by the bracket.

7. The decoy system of claim 1, wherein the at least one leg includes two legs extending from the bracket.

8. A decoy system comprising:
   a decoy stake including:
      a rod;
      a bracket coupled to a lower end of the rod, the bracket including opposing side panels defining opposing planes; and
      at least one leg having an upper end coupled to the bracket; and
   a substantially flat decoy supported on the rod and configured to rotate about the rod;
   wherein the bracket includes a rotational stop configured to directly contact a first face of the substantially flat decoy for preventing more than 180 degree rotation of the substantially flat decoy about the rod.

9. The system of claim 8, wherein the rod, the decoy, and the at least one leg are selectively configurable to simultaneously extend within and not outside the opposing planes.

10. The decoy system of claim 8, wherein the substantially flat decoy includes a corrugated material and the rod is configured to be removably inserted completely through the corrugated material.

11. The decoy system of claim 8, the rod including an upper end forming a handle.

12. The decoy system of claim 8, the substantially flat decoy including a lower edge that is directly rotatably supported on a top surface of the bracket.

13. The decoy system of claim 8, wherein the rod is spaced from the at least one leg by the bracket.

14. The decoy system of claim 8, wherein the at least one leg includes two legs extending from the bracket, the two legs being integrally formed.

15. The decoy system of claim 8, wherein the rotational stop extends upwardly from a top surface of the bracket.

16. A method of using a decoy comprising:
   providing a decoy stake including:
      a rod;
      an upper end forming a handle;
      a bracket coupled to a lower end of the rod, the bracket including a stop extending upwardly from the bracket;
      a substantially flat decoy supported on the rod between the handle and the bracket and configured to rotate about the rod; and
      at least one leg having an upper end coupled to the bracket;
   inserting the at least one leg into a surface;
   limiting rotation of the substantially flat decoy about the rod by directly contacting the stop to a flat surface of the substantially flat decoy,
   removing the at least one leg from the surface by pulling the handle away from the surface; and
   wherein the decoy stake remains intact when pulling the handle away from the surface.

17. The method of claim 16, wherein the bracket further includes a rotational stop configured to directly contact a first face of the substantially flat decoy, the method further including preventing more than 180 degree rotation of the substantially flat decoy about the rod.

18. The method of claim 16, wherein the bracket includes opposing side panels defining opposing planes, the method further including causing the rod, the substantially flat decoy, and the at least one leg to simultaneously extend within and not outside of the opposing planes.

19. The method of claim 16, further including storing the decoy stake by stacking a plurality of decoy stakes together in a substantially flat configuration.

20. The method of claim 17, further including causing the substantially flat decoy to rotate about the rod while the rod, the bracket and the at least one leg remain stationary.

* * * * *